US012769887B2

(12) United States Patent
Lepaksha et al.

(10) Patent No.: US 12,769,887 B2
(45) Date of Patent: Oct. 20, 2026

(54) PROVIDING AUTHENTICATED-EXCLUSIVE ACCESS TO SHARED RESOURCES IN PROCESSOR-BASED DEVICES

(71) Applicant: QUALCOMM Incorporated, San Diego, CA (US)

(72) Inventors: Hithesh Hassan Lepaksha, Hyderabad (IN); Darshan Kumar Nandanwar, Bangalore (IN); Sagar Bamashetti, Chadchan (IN)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 18/604,968

(22) Filed: Mar. 14, 2024

(65) Prior Publication Data

US 2025/0291939 A1 Sep. 18, 2025

(51) Int. Cl.
*G06F 21/71* (2013.01)
*G06F 12/14* (2006.01)

(52) U.S. Cl.
CPC .............. *G06F 21/71* (2013.01); *G06F 12/14* (2013.01)

(58) Field of Classification Search
CPC .......... G06F 21/71; G06F 21/51; G06F 13/00; G06F 13/4295; G06F 13/4282; G06F 13/42; G06F 12/14
See application file for complete search history.

(56) References Cited

U.S. PATENT DOCUMENTS

2009/0077645 A1* 3/2009 Kottahachchi .......... G06F 21/33 726/9
2016/0062944 A1* 3/2016 Xiong ..................... H04L 51/18 709/212
2021/0342152 A1* 11/2021 Horsnell ............... G06F 9/3834
2024/0070277 A1* 2/2024 Ge ........................ G06F 21/602

OTHER PUBLICATIONS https://www.embedded.com/dealing-with-memory-access-ordering-in-complex-embedded-designs/ (Year: 2014).*

* cited by examiner

*Primary Examiner* — Alexander Lagor
*Assistant Examiner* — Brandon Binczak
(74) *Attorney, Agent, or Firm* — W&T

(57) ABSTRACT

In some aspects disclosed herein, a processor-based device includes a plurality of processor cores, and a shared resource that is communicatively coupled to each processor core of the plurality of processor cores via an interconnect. The processor-based device also includes an authenticated-exclusive monitor circuit that is configured to receive, from a requestor, an authenticated load exclusive (ALE) request that is directed to an address of the shared resource and that comprises an authentication key. The authenticated-exclusive monitor circuit is further configured to determine whether the authentication key is valid, and, if so, to place the address of the shared resource in an authenticated tagged state associated with the requestor. The authenticated-exclusive monitor circuit is additionally configured to, further responsive to determining that the authentication key is valid, transmit a return value to the requestor.

26 Claims, 9 Drawing Sheets

FIG. 1 – PRIOR ART

PROVIDING AUTHENTICATED-EXCLUSIVE ACCESS TO SHARED RESOURCES IN PROCESSOR-BASED DEVICES

TECHNICAL FIELD

The technology of the disclosure relates generally to accessing shared resources in processor-based devices, and, in particular, to mutual exclusion ("mutex") synchronization mechanisms.

BACKGROUND

Modern processor-based devices may include multiple processor cores that can range in number from two (2) processor cores up to hundreds or even thousands of processor cores. Such processor-based devices may also provide different types of shared resources that can be accessed by multiple requestors (e.g., multiple threads executing on the same or different processor cores). Such shared resources may include, as non-limiting examples, memory devices, peripheral devices, communications buses, queues or caches, and/or sections of executable code. In a multicore environment, it is necessary to implement mechanisms to ensure that only one requestor at a time can access a shared resource. This helps to prevent race conditions wherein the behavior of executing software may become unpredictable due to multiple requestors accessing and/or modifying the shared resource simultaneously.

One such mechanism for governing access to a shared resource is a mutual exclusion ("mutex") synchronization primitive. In instruction set architectures (ISAs) such as those provided by ARM and RISC V, a mutex is implemented using a load register exclusive (LDRX) instruction and a store register exclusive (STRX) instruction that are executed atomically by a requestor to obtain exclusive access to a shared resource. In conjunction with the LDRX and STRX instructions, such ISAs also provide monitor circuits that monitor the shared resource to detect exclusive accesses by a requestor. A monitor circuit may comprise a "local" monitor circuit that implements a mutex for multiple threads executing on a single processor core, or may comprise a "global" monitor circuit that implements a mutex for threads executing on different processor cores.

When a requestor executes an LDRX instruction directed to a shared resource such as a memory device, a return value is read from an address of the memory device and returned to the requestor, and the corresponding monitor circuit is signaled to begin monitoring the address. The monitor circuit places the address into a "tagged" state that associates it with the original requestor. The monitor circuit then determines whether any other requestor writes to the address before the original requestor performs its own write by executing a STRX instruction. If the original requestor executes the STRX instruction to the monitored address before any other requestor writes to the monitored address, a lock on the monitored address is acquired and the original requestor's store operation succeeds. However, if another requestor has written to the monitored address, the original requestor's store operation fails, and the STRX instruction returns a value indicating failure.

If another data access (e.g., a conventional store operation) to the monitored address is performed by the original requestor between the LDRX instruction and the corresponding STRX instruction, or if an exception occurs, the monitor circuit ends its monitoring of the address by returning the address to an "untagged" state. This ensures that the subsequent STRX instruction executed by the original requestor fails, which ensures atomicity. Similarly, a conventional store operation from any other requestor between the LDRX instruction and the corresponding STRX instruction of the original requestor results in the address being returned to the untagged state. However, this latter behavior raises the possibility that a malicious requestor may attempt to perform continuous store operations to the address, causing it to remain in the untagged state and preventing other requestors from acquiring a lock on the address. If such a malicious requestor can issue the store operations at a high enough frequency, it may be able to perform a denial-of-service (DOS) attack on the shared resource using just the address.

Accordingly, it is desirable to implement a more secure mechanism for implementing a mutex for a shared resource, without negatively impacting the performance of the processor-based device.

SUMMARY OF THE DISCLOSURE

Aspects disclosed in the detailed description include providing authenticated-exclusive access to shared resources in processor-based devices. Related apparatus and methods are also disclosed. In this regard, in some exemplary aspects disclosed herein, a processor-based device comprising a plurality of processor cores includes an authenticated-exclusive monitor circuit to implement a more secure mutual exclusion ("mutex") mechanism. The authenticated-exclusive monitor circuit may comprise a local authenticated-exclusive monitor circuit or a global authenticated-exclusive monitor circuit, as non-limiting examples. In exemplary operation, the authenticated-exclusive monitor circuit receives an authenticated load exclusive (ALE) request from a requestor (e.g., a thread executing on a processor core of the processor-based device). In some aspects, the ALE request may result from execution of an ALE instruction of an instruction set architecture (ISA) implemented by the processor-based device. The ALE request is directed to an address of a shared resource of the processor-based device, and comprises an authentication key. The authenticated-exclusive monitor circuit determines whether the authentication key is valid, and, if so, places the address of the shared resource in an authenticated tagged state associated with the requestor. The authenticated-exclusive monitor circuit also transmits a return value to the requestor.

According to some aspects, the authenticated-exclusive monitor circuit subsequently receives an authenticated store exclusive (ASE) request from the requestor. The ASE request in some aspects may result from execution of an ASE instruction of the ISA of the processor-based device. The ASE request is directed to the address of the shared resource and comprises the authentication key. The authenticated-exclusive monitor circuit determines whether the authentication key is valid, and, if so, also determines whether the address of the shared resource is in the authenticated tagged state associated with the requestor. If both conditions are met, the authenticated-exclusive monitor circuit acquires a lock on the address of the shared resource for the requestor. After a store operation using the address of the shared resource is performed (e.g., by the requestor), the authenticated-exclusive monitor circuit places the shared resource in an untagged state.

According to some aspects, if the authentication key is determined to not be valid, the authenticated-exclusive monitor circuit transmits an authentication failure indication to the requestor. The authentication failure indication may comprise, e.g., an exception or an interrupt raised by the authenticated-exclusive monitor circuit. The authenticated-exclusive monitor circuit in some such aspects may track how many times authentication attempts have failed for the requestor by incrementing a count of failed authentication attempts by the requestor. The authenticated-exclusive monitor circuit in some aspects may also transmit the authentication failure indication to the requestor (and increment the count of failed authentication attempts by the requestor, according to some such aspects) if the authenticated-exclusive monitor circuit receives a request that does not comprise an authentication key. Some aspects may provide that the authenticated-exclusive monitor circuit returns the address of the shared resource to an untagged state in response to receiving an ASE request directed to the address of the shared resource from a requestor without a lock on the address of the shared resource, or in response to receiving an authenticated clear exclusive (ACLRX) request directed to the address of the shared resource from any requestor.

In some aspects, prior to receiving the ALE request, the authenticated-exclusive monitor circuit receives a copy of the authentication key from a secure key generator. In such aspects, the operations for determining whether the authentication key is valid may comprise the authenticated-exclusive monitor circuit using an authentication circuit to determine whether the authentication key provided by the ALE request matches the copy of the authentication key received from the secure key generator. Some aspects may also provide that the operations for determining whether the authentication key is valid may comprise the authenticated-exclusive monitor circuit determining, using the authentication circuit, whether the authentication key is valid within a specified time interval, and/or determining whether the count of failed authentication attempts by the requestor does not exceed a failed authentication attempt threshold.

In another aspect, a processor-based device is provided. The processor-based device comprises a plurality of processor cores, and a shared resource that is communicatively coupled to each processor core of the plurality of processor cores via an interconnect. The processor-based device further comprises an authenticated-exclusive monitor circuit that is configured to receive, from a first requestor, an ALE request that is directed to an address of the shared resource and that comprises a first authentication key. The authenticated-exclusive monitor circuit is further configured to determine whether the first authentication key is valid. The authenticated-exclusive monitor circuit is also configured to, responsive to determining that the first authentication key is valid, place the address of the shared resource in an authenticated tagged state associated with the first requestor. The authenticated-exclusive monitor circuit is additionally configured to, further responsive to determining that the first authentication key is valid, transmit a return value to the first requestor.

In another aspect, a processor-based device is provided. The processor-based device comprises means for receiving, from a first requestor, an ALE request that is directed to an address of a shared resource and that comprises a first authentication key. The processor-based device further comprises means for determining whether the first authentication key is valid. The processor-based device also comprises means for placing the address of the shared resource in an authenticated tagged state associated with the first requestor, responsive to determining that the first authentication key is valid. The processor-based device additionally comprises means for transmitting a return value to the first requestor, further responsive to determining that the first authentication key is valid.

In another aspect, a method for providing authenticated-exclusive access to shared resources in processor-based devices is provided. The method comprises receiving, by an authenticated-exclusive monitor circuit of a processor-based device from a first requestor, an ALE request that is directed to an address of a shared resource of the processor-based device and that comprises a first authentication key. The method further comprises determining, by the authenticated-exclusive monitor circuit, that the first authentication key is valid. The method also comprises, responsive to determining that the first authentication key is valid, placing, by the authenticated-exclusive monitor circuit, the address of the shared resource in an authenticated tagged state associated with the first requestor. The method additionally comprises, further responsive to determining that the first authentication key is valid, transmitting, by the authenticated-exclusive monitor circuit, a return value to the first requestor.

In another aspect, a non-transitory computer-readable medium is disclosed, having stored thereon computer-executable instructions which, when executed by a processor-based device, cause the processor-based device to receive, from a first requestor, an ALE request that is directed to an address of a shared resource of the processor-based device and that comprises a first authentication key. The computer-executable instructions further cause the processor-based device to determine whether the first authentication key is valid. The computer-executable instructions also cause the processor-based device to, responsive to determining that the first authentication key is valid, place the address of the shared resource in an authenticated tagged state associated with the first requestor. The computer-executable instructions additionally cause the processor-based device to, further responsive to determining that the first authentication key is valid, transmit a return value to the first requestor.

DETAILED DESCRIPTION

Figure 1:
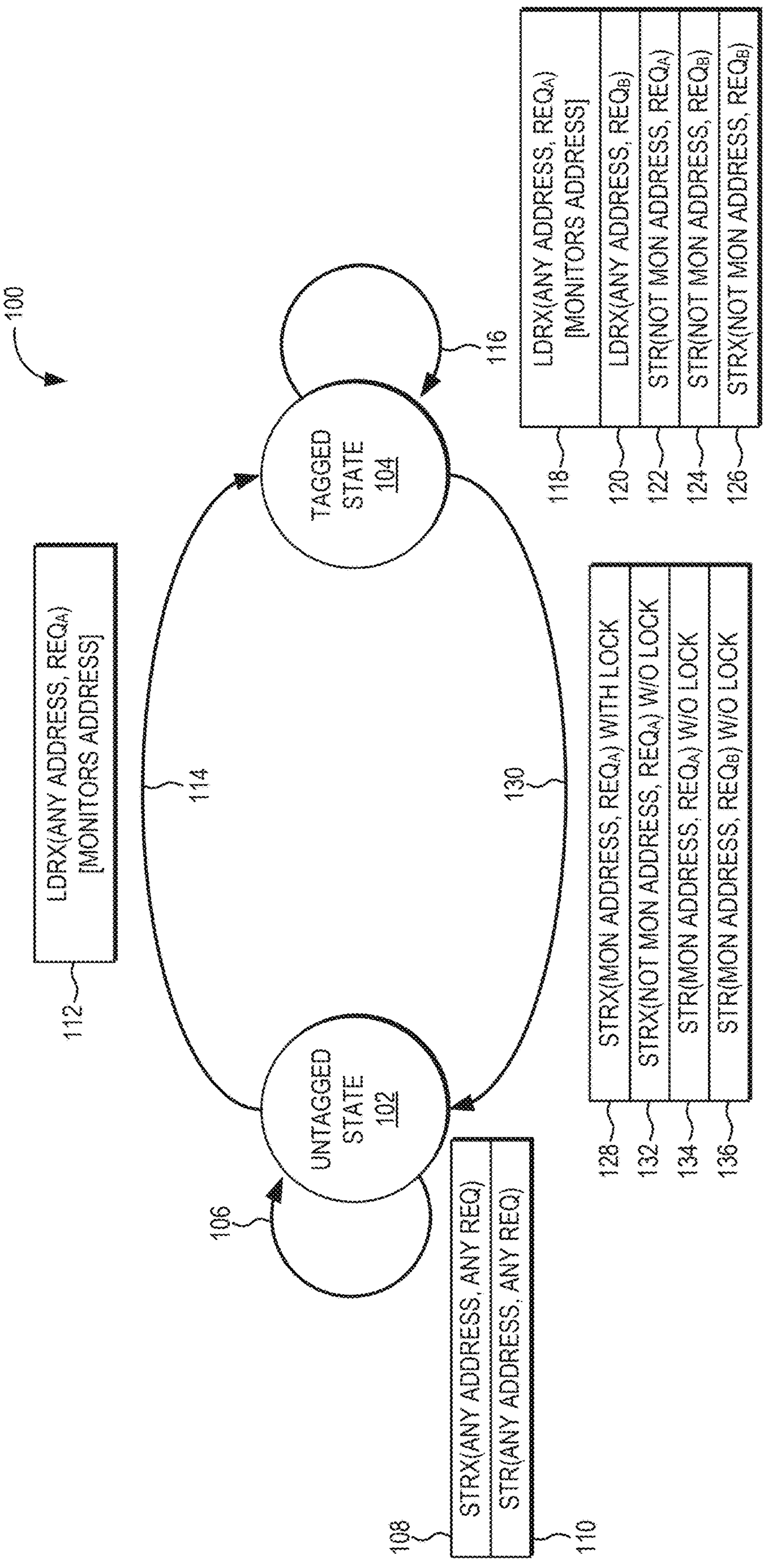
FIG. 1 is a block diagram illustrating state transitions of a shared resource between an untagged state and a tagged state using conventional mutual exclusion ("mutex") synchronization mechanisms.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like (e.g., "first requestor," "second requestor," and so forth) are used herein to distinguish between similarly named elements, and are not intended to indicate an ordinal relationship between such elements unless otherwise described as such.

Aspects disclosed in the detailed description include providing authenticated-exclusive access to shared resources in processor-based devices. Related apparatus and methods are also disclosed. In this regard, in some exemplary aspects disclosed herein, a processor-based device comprising a plurality of processor cores includes an authenticated-exclusive monitor circuit to implement a more secure mutual exclusion ("mutex") mechanism. The authenticated-exclusive monitor circuit may comprise a local authenticated-exclusive monitor circuit or a global authenticated-exclusive monitor circuit, as non-limiting examples. In exemplary operation, the authenticated-exclusive monitor circuit receives an authenticated load exclusive (ALE) request from a requestor (e.g., a thread executing on a processor core of the processor-based device). In some aspects, the ALE request may result from execution of an ALE instruction of an instruction set architecture (ISA) implemented by the processor-based device. The ALE request is directed to an address of a shared resource of the processor-based device, and comprises an authentication key. The authenticated-exclusive monitor circuit determines whether the authentication key is valid, and, if so, places the address of the shared resource in an authenticated tagged state associated with the requestor. The authenticated-exclusive monitor circuit also transmits a return value to the requestor.

According to some aspects, the authenticated-exclusive monitor circuit subsequently receives an authenticated store exclusive (ASE) request from the requestor. The ASE request in some aspects may result from execution of an ASE instruction of the ISA of the processor-based device. The ASE request is directed to the address of the shared resource and comprises the authentication key. The authenticated-exclusive monitor circuit determines whether the authentication key is valid, and, if so, also determines whether the address of the shared resource is in the authenticated tagged state associated with the requestor. If both conditions are met, the authenticated-exclusive monitor circuit acquires a lock on the address of the shared resource for the requestor. After a store operation using the address of the shared resource is performed (e.g., by the requestor), the authenticated-exclusive monitor circuit places the shared resource in an untagged state.

According to some aspects, if the authentication key is determined to not be valid, the authenticated-exclusive monitor circuit transmits an authentication failure indication to the requestor. The authentication failure indication may comprise, e.g., an exception or an interrupt raised by the authenticated-exclusive monitor circuit. The authenticated-exclusive monitor circuit in some such aspects may track how many times authentication attempts have failed for the requestor by incrementing a count of failed authentication attempts by the requestor. The authenticated-exclusive monitor circuit in some aspects may also transmit the authentication failure indication to the requestor (and increment the count of failed authentication attempts by the requestor, according to some such aspects) if the authenticated-exclusive monitor circuit receives a request that does not comprise an authentication key. Some aspects may provide that the authenticated-exclusive monitor circuit returns the address of the shared resource to an untagged state in response to receiving an ASE request directed to the address of the shared resource from a requestor without a lock on the address of the shared resource, or in response to receiving an authenticated clear exclusive (ACLRX) request directed to the address of the shared resource from any requestor.

In some aspects, prior to receiving the ALE request, the authenticated-exclusive monitor circuit receives a copy of the authentication key from a secure key generator. In such aspects, the operations for determining whether the authentication key is valid may comprise the authenticated-exclusive monitor circuit using an authentication circuit to determine whether the authentication key provided by the ALE request matches the copy of the authentication key received from the secure key generator. Some aspects may also provide that the operations for determining whether the authentication key is valid may comprise the authenticated-exclusive monitor circuit determining, using the authentication circuit, whether the authentication key is valid within a specified time interval, and/or determining whether the count of failed authentication attempts by the requestor does not exceed a failed authentication attempt threshold.

Before discussing providing authenticated-exclusive access to shared resources according to aspects disclosed herein, the state transitions of a shared resource when using a conventional mutex synchronization mechanism is first discussed. In this regard, FIG. 1 provides a state transition diagram 100. As seen in FIG. 1, a shared resource (e.g., an address of a memory device) may transition between an untagged state 102 and a tagged state 104. While the address is in the untagged state 102, a monitor circuit (not shown) that implements the mutex does not associate the address with a requestor, and does not monitor write operations directed to the address. As indicated by arrow 106, the execution of a store register exclusive (STRX) instruction 108 or a conventional store (STR) instruction 110 that is directed to any address of the memory device and that originates from any requestor does not change the untagged state 102 of the address.

The state of the address will transition from the untagged state 102 to the tagged state 104 upon execution of a load register exclusive (LDRX) instruction 112 that is directed to any address from a requestor $REQ_A$, as indicated by arrow 114. In the tagged state 104, the monitor circuit associates the address with the requestor $REQ_A$, and begins monitoring write operations to the monitored address. As indicated by arrow 116, the address remains in the tagged state 104 in response to execution of any of the following instructions:

- An LDRX instruction 118 from the requestor $REQ_A$ directed to any address (in which case the address of the LDRX instruction becomes the monitored address);

An LDRX instruction 120 from a different requestor $REQ_B$ directed to any address (in which case the address of the LDRX instruction becomes the monitored address, and the address is associated with the requestor $REQ_B$);

An STR instruction 122 from the requestor $REQ_A$ to any address other than the monitored address;

An STR instruction 124 from the different requestor $REQ_B$ to any address other than the monitored address; or An STRX instruction 126 from the different requestor $REQ_B$ to any address other than the monitored address.

If, while in the tagged state 104, the requestor $REQ_A$ executes a STRX instruction 128 directed to the monitored address, the monitor circuit acquires a lock on the address on behalf of the requestor $REQ_A$, and a store operation can then be performed to the address atomically with the previous LDRX instruction executed by the requestor $REQ_A$. The address then transitions back to the untagged state 102, as indicated by the arrow 130. The address may also be transitioned back to the untagged state 102 in response to execution of any of the following instructions:

An STRX instruction 132 from the requestor $REQ_A$ to any address other than the monitored address when a lock on the address has not been acquired on behalf of the requestor $REQ_A$;

An STR instruction 134 from the requestor $REQ_A$ to the monitored address when a lock on the address has not been acquired on behalf of the requestor $REQ_A$; or An STR instruction 136 from the different requestor $REQ_B$ to the monitored address when a lock on the address has not been acquired on behalf of the requestor $REQ_B$.

Note that the state transition from the tagged state 104 to the untagged state 102 in response to execution of the STR instruction 136 from the requestor $REQ_B$ may open the possibility of a denial-of-service (DOS) attack on the shared resource using just the address. For example, if the requestor $REQ_B$ is a malicious requestor that repeatedly executes the STR instruction 136 at a high enough frequency, it may cause the address to remain in the untagged state 102, thereby preventing other requestors such as the requestor $REQ_A$ from acquiring a lock on the address.

Figure 2:
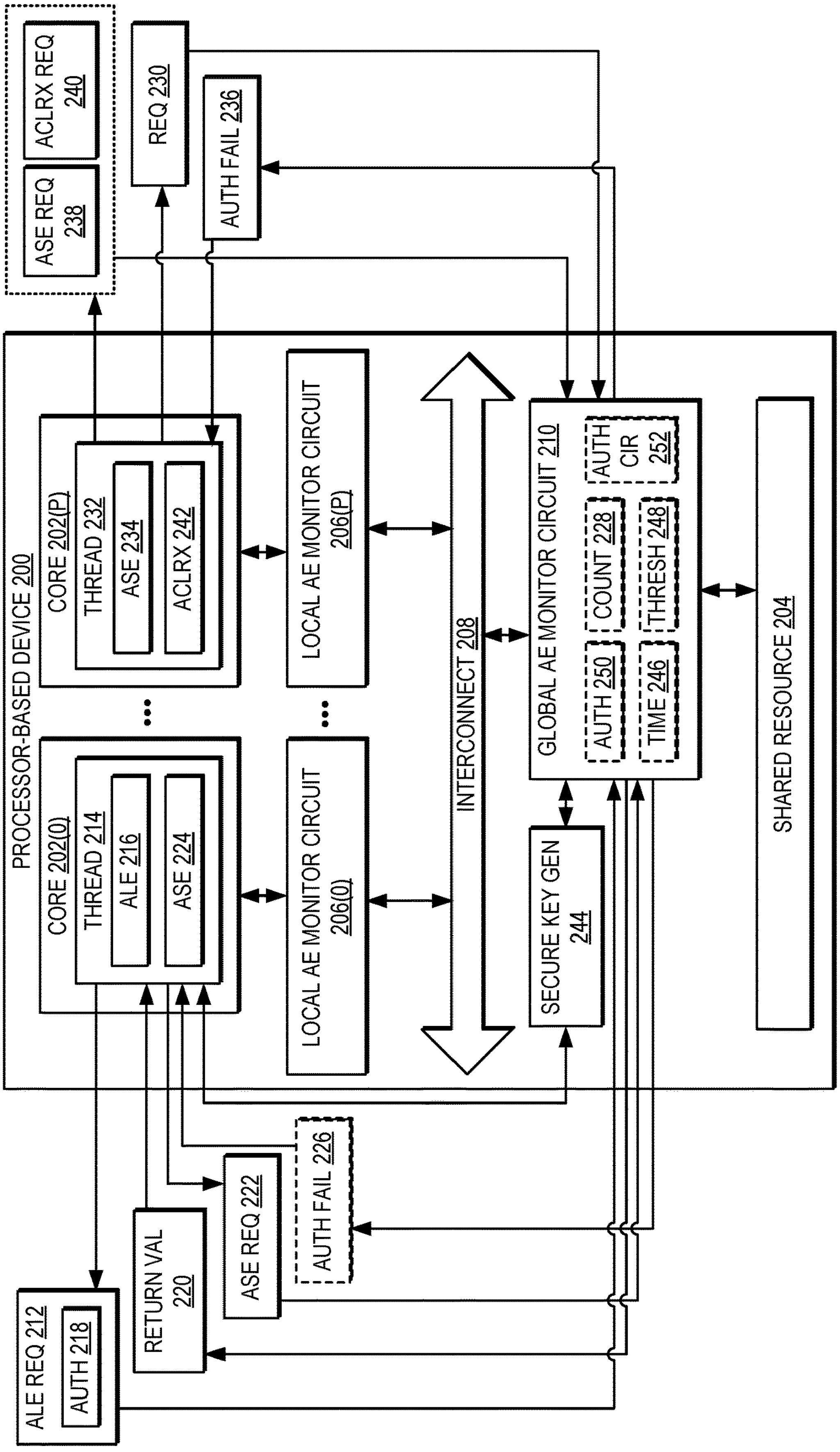
FIG. 2 is a block diagram illustrating an exemplary processor-based device including authenticated-exclusive monitor circuits that provide authenticated-exclusive access to a shared resource, according to some aspects.

In this regard, FIG. 2 is a block diagram of an exemplary processor-based device 200 that is configured to provide authenticated-exclusive access to shared resources. Examples of the processor-based device 200 may include, but are not limited to, a digital signal processor (DSP), general-purpose microprocessor, application specific integrated circuit (ASIC), field programmable logic array (FPGA), or other equivalent integrated or discrete logic circuitry.

The processor-based device 200 of FIG. 2 comprises a plurality of processor cores (captioned as "CORE" in FIG. 2) 202(0)-202(P), each of which may be referred to herein as a "CPU core." Each of the processor cores 202(0)-202(P) is communicatively coupled to a shared resource 204 via corresponding local authenticated-exclusive monitor circuits (captioned as "LOCAL AE MONITOR CIRCUIT" in FIG. 2) 206(0)-206(P), an interconnect 208, and a global authenticated-exclusive monitor circuit (captioned as "GLOBAL AE MONITOR CIRCUIT" in FIG. 2) 210. The shared resource 204 may comprise, e.g., a memory device, a peripheral, a queue or cache, or a section of executable code, as non-limiting examples. As discussed in greater detail below, each of the global authenticated-exclusive monitor circuit 210 and the local authenticated-exclusive monitor circuits 206(0)-206(P) are configured to provide authenticated-exclusive access to the shared resource 204, and thus each may be generally referred to herein as an "authenticated-exclusive monitor circuit." Each of the local authenticated-exclusive monitor circuits 206(0)-206(P) implements mutex between multiple threads executing on the corresponding processor cores 202(0)-202(P), while the global authenticated-exclusive monitor circuit 210 implements mutex between threads executing on different ones of the processor cores 202(0)-202(P). For the sake of clarity, authenticated-exclusive access provision is discussed below with respect to the global authenticated-exclusive monitor circuit 210. However, it is to be understood that the local authenticated-exclusive monitor circuits 206(0)-206(P) are each configured to provide functionality corresponding to that of the global authenticated-exclusive monitor circuit 210.

The processor-based device 200 of FIG. 2 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 200 may include elements in addition to those illustrated in FIG. 2, and/or may include more or fewer of the elements illustrated in FIG. 2. For example, the processor-based device 200 may further include additional processor cores, caches, controllers, communications buses, and/or persistent storage devices, which are omitted from FIG. 2 for the sake of clarity.

To implement authenticated-exclusive access to the shared resource 204, each authenticated-exclusive monitor circuit such as the global authenticated-exclusive monitor circuit 210 is configured to support an "authenticated tagged" state, which is discussed below in greater detail with respect to FIG. 3. In exemplary operation, the shared resource 204 begins in an untagged state. An authenticated-exclusive monitor circuit (the global authenticated-exclusive monitor circuit 210, in this example) receives an ALE request (captioned as "ALE REQ" in FIG. 2) 212 from a requestor (e.g., a thread 214 of the processor core 202(0), in this example). The ALE request 212 in FIG. 2 results from execution of an ALE instruction (captioned as "ALE" in FIG. 2) 216 of the ISA of the processor-based device 200 by the thread 214. The ALE request 212 is directed to an address of the shared resource 204 (e.g., an address indicating a memory location), and comprises an authentication key (captioned as "AUTH" in FIG. 2) 218.

The global authenticated-exclusive monitor circuit 210 next determines whether the authentication key 218 is valid. If so, the global authenticated-exclusive monitor circuit 210 places the address of the shared resource 204 in an authenticated tagged state associated with the thread 214 (e.g., by storing an identifier of the thread 214 (not shown) in association with the address of the shared resource 204). The global authenticated-exclusive monitor circuit 210 then transmits a return value (captioned as "RETURN VAL" in FIG. 2) 220 (e.g., a data value stored at the address of the shared resource 204) to the thread 214.

The global authenticated-exclusive monitor circuit 210 subsequently receives, from the thread 214, an ASE request (captioned as "ASE REQ" in FIG. 2) 222 (e.g., resulting from execution of an ASE instruction (captioned as "ASE" in FIG. 2) 224 of the ISA) that is directed to the address of the shared resource 204 and that comprises the authentication key 218. The global authenticated-exclusive monitor circuit 210 determines whether the authentication key 218 is valid, and, if so, next determines whether the shared resource 204 is in the authenticated tagged state associated with the thread 214. If so, the global authenticated-exclusive monitor circuit 210 acquires a lock on the address of the shared resource 204 for the thread 214, and a store operation using the address of the shared resource 204 is performed. The global authenticated-exclusive monitor circuit 210 then places the shared resource 204 in an untagged state.

In some aspects, if the global authenticated-exclusive monitor circuit 210 determines that the authentication key 218 is not valid, the global authenticated-exclusive monitor circuit 210 transmits an authentication failure indication (captioned as "AUTH FAIL" in FIG. 2) 226 to the thread 214. The authentication failure indication 226 may comprise, e.g., an exception or an interrupt raised by the global authenticated-exclusive monitor circuit 210. The global authenticated-exclusive monitor circuit 210 in some such aspects may also track how many times authentication attempts have failed for the thread 214 by incrementing a count 228 of failed authentication attempts by the thread 214. It is to be understood that the global authenticated-exclusive monitor circuit 210 may maintain multiple counts 228, with each corresponding to a different requestor such as the thread 214. As discussed in greater detail below, the count 228 of failed authentication attempts may be used to limit the number of unsuccessful authentication attempts by the thread 214.

The global authenticated-exclusive monitor circuit 210 according to some aspects may also transmit an authentication failure indication in response to receiving an unauthenticated request. Thus, for example, the global authenticated-exclusive monitor circuit 210 may receive a request (captioned as "REQ" in FIG. 2) 230 from a thread 232 of the processor core 202(P) (e.g., resulting from execution of an ASE instruction (captioned as "ASE" in FIG. 2) 234 by the thread 232, as a non-limiting example). The global authenticated-exclusive monitor circuit 210 determines that the request 230 does not include an authentication key, and, in response, transmits an authentication failure indication (captioned as "AUTH FAIL" in FIG. 2) 236 to the thread 232. In some aspects, the global authenticated-exclusive monitor circuit 210 may also increment a count (not shown) of failed authentication attempts by the thread 232.

Some aspects may provide that the global authenticated-exclusive monitor circuit 210 returns the address of the shared resource 204 to an untagged state in response to certain circumstances. For example, the global authenticated-exclusive monitor circuit 210 may receive a request that comprises an ASE request (captioned as "ASE REQ" in FIG. 2) 238 (resulting from execution of the ASE instruction 234) directed to the address of the shared resource 204 from a requestor (such as the thread 232) without a lock on the address of the shared resource 204, or a request that comprises an authenticated clear exclusive (ACLRX) request (captioned as "ACLRX REQ" in FIG. 2) 240 (resulting from execution of an ACLRX instruction (captioned as "ACLRX" in FIG. 2) 242) directed to the address of the shared resource 204 from any requestor. In response to receiving the request, the global authenticated-exclusive monitor circuit 210 places the address of the shared resource 204 in an untagged state. Note that only an ASE request or an ACLRX request can cause the global authenticated-exclusive monitor circuit 210 to change the state from the authenticated tagged state to the untagged state. This enables genuine requestors with authentication keys to acquire locks on the shared resource 204 without a malicious requestor's intrusion.

Some aspects may further provide that, before the operations described above for receiving and validating requests from requestors such as the thread 214, the global authenticated-exclusive monitor circuit 210 and the thread 214 first participate in a secure key exchange to enable the global authenticated-exclusive monitor circuit 210 to authenticate requests such as the ALE request 212 and the ASE request 222. In such aspects, a secure key generator (captioned as "SECURE KEY GEN" in FIG. 2) 244 is provided to facilitate the secure key exchange. The secure key generator 244 according to some such aspects may comprise a known-secure processor circuit, or may comprise a known-secure application executing at a highest privilege level by the processor-based device 200 (e.g., executing in EL3 secure mode). While the secure key generator 244 is illustrated in FIG. 2 as an element of the processor-based device 200, it is to be understood that some aspects may provide that the secure key generator 244 is located external to the processor-based device 200.

To perform the key exchange, the thread 214 first authenticates itself with the secure key generator 244 using a private key (e.g., a private key embedded within executable code, or a private key provided by a user during execution, as non-limiting examples). The secure key generator 244 then provides the thread 214 with the authentication key 218. In some aspects, the authentication key 218 is configured to be valid only within a specified time interval (captioned as "TIME" in FIG. 2) 246 and/or only for a specified number of authentication attempts represented by a failed authentication attempt threshold (captioned as "THRESH" in FIG. 2) 248. The secure key generator 244 also configures the global authenticated-exclusive monitor circuit 210 with a copy (captioned as "AUTH" in FIG. 2) 250 of the authentication key 218. In some aspects, the thread 214 includes the authentication key 218 as part of, e.g., the ALE request 212 by hashing the address of the shared resource 204 and the authentication key 218 to generate a cryptographic tag, which is then placed in unused bits of an address field (not shown) of the ALE instruction 216.

After receiving the copy 250 of the authentication key 218 from the secure key generator 244 and receiving the ALE request 212 from the thread 214, the global authenticated-exclusive monitor circuit 210 extracts the authentication key 218. The global authenticated-exclusive monitor circuit 210 in some aspects then determines whether the authentication key 218 is valid by using an authentication circuit (captioned as "AUTH CIR" in FIG. 2) 252 to determine whether the authentication key 218 matches the copy 250 of the authentication key 218. The global authenticated-exclusive monitor circuit 210 may also determine, using the authentication circuit 252, whether the authentication key 218 is valid within the specified time interval 246. If the specified time interval 246 has expired, the global authenticated-exclusive monitor circuit 210 considers the authentication key 218 to no longer be valid. In some aspects, the global authenticated-exclusive monitor circuit 210 may use the authentication circuit 252 to determine whether the count 228 of failed authentication attempts by the thread 214 does not exceed the failed authentication attempt threshold 248. If the count 228 of failed authentication attempts exceeds the failed authentication attempt threshold 248, the global authenticated-exclusive monitor circuit 210 considers the authentication key 218 to no longer be valid.

Figure 3:
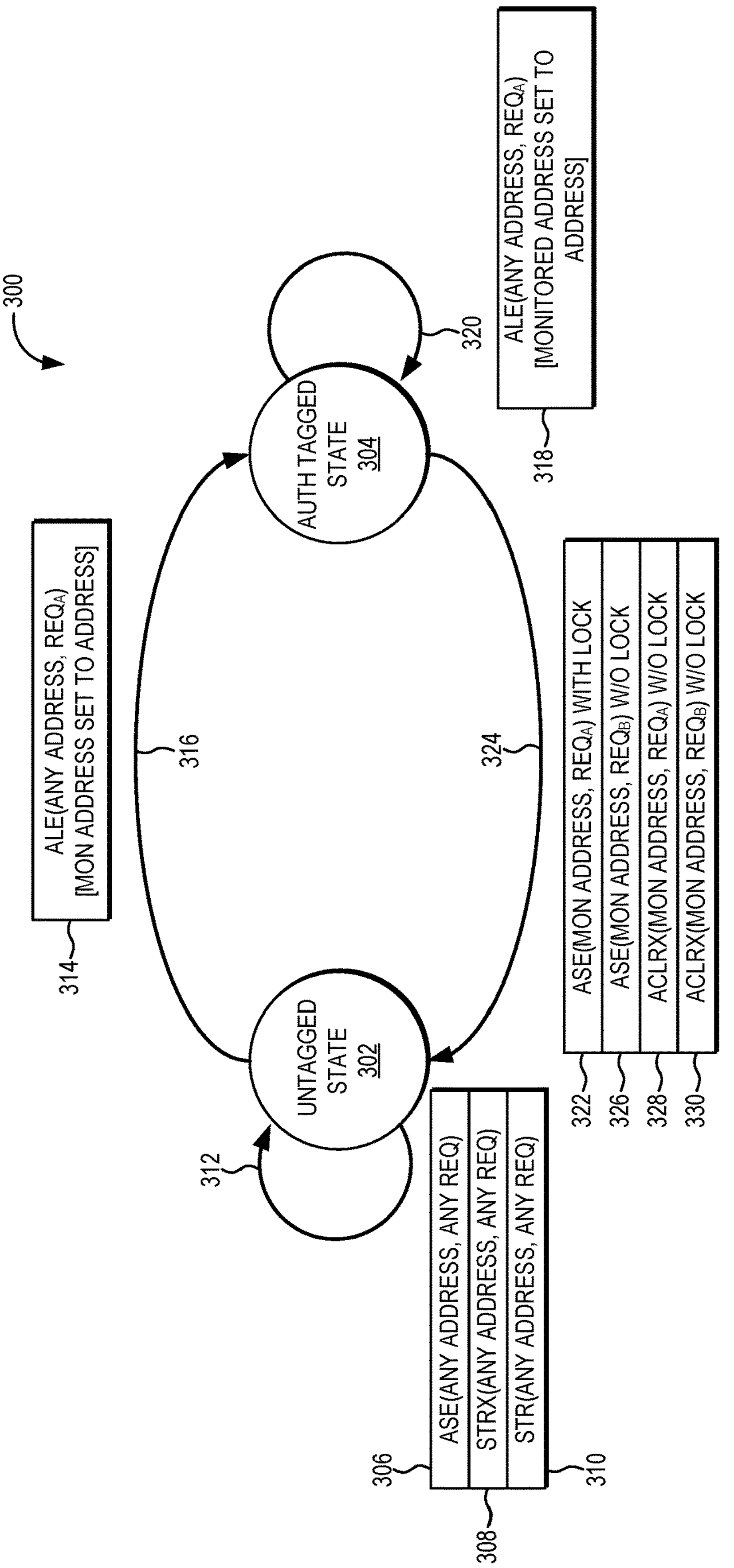
FIG. 3 is a block diagram illustrating state transitions of a shared resource between an untagged state and an authenticated tagged state using the authenticated-exclusive monitor circuits of FIG. 2, according to some aspects.

To illustrate state transitions of the shared resource 204 between an untagged state and an authenticated tagged state using an authenticated-exclusive monitor circuit such as the authenticated-exclusive monitor circuit 210 of FIG. 2 according to some aspects, FIG. 3 provides a state transition diagram 300. In the example of FIG. 3, a shared resource, such as an address of the shared resource 204 of FIG. 2, may transition between an untagged state 302 and an authenticated tagged state (captioned as "AUTH TAGGED STATE" in FIG. 3) 304. While the address is in the untagged state 302, the authenticated-exclusive monitor circuit 210 does not associate the address with a requestor, and does not monitor write operations directed to the address. The execution of an ASE instruction 306, an STRX instruction 308, or an STR instruction 310 that is directed to any address of the memory device and that originates from any requestor does not change the untagged state 302 of the address, as indicated by arrow 312.

Upon successful execution of an ALE instruction 314 that is directed to any address from a requestor $REQ_A$, the state of the address will transition to the authenticated tagged state, as indicated by arrow 316. The authenticated tagged state 304 indicates that the authenticated-exclusive monitor circuit 210 has successfully validated the ASE request from the requestor $REQ_A$. The authenticated-exclusive monitor circuit 210 thus associates the address with the requestor $REQ_A$, and begins monitoring write operations to the monitored address. The address remains in the authenticated tagged state 304 in response to execution of an ALE instruction 318 from the requestor $REQ_A$ directed to any address as indicated by arrow 320, in which case the address of the ALE instruction becomes the monitored address. However, the execution of any of the following instructions (not shown) while the address is in the authenticated tagged state 304 will result in an authentication failure indication (such as the authentication failure indication 226 of FIG. 2) being transmitted to the requestor without a change in state:

- An LDRX instruction from the requestor $REQ_A$ to the monitored address;
- An STRX instruction from the requestor $REQ_A$ to the monitored address;
- An LDRX instruction from a different requestor $REQ_B$ to any address;
- An STR instruction from the requestor $REQ_A$ to any address other than the monitored address;
- An STR instruction from the different requestor $REQ_B$ to any address other than the monitored address;
- An STRX instruction from the different requestor $REQ_B$ to any address other than the monitored address;
- An STR instruction from the different requestor $REQ_B$ to the monitored address;
- An STRX instruction from the requestor $REQ_A$ to any address other than the monitored address; or
- An STR instruction from the requestor $REQ_A$ to the monitored address.

While in the authenticated tagged state 304, execution of an ASE instruction 322 directed to the monitored address by the requestor $REQ_A$ results in the authenticated-exclusive monitor circuit 210 acquiring a lock on the address on behalf of the requestor $REQ_A$. A store operation can then be performed to the address atomically with the previous ALE instruction executed by the requestor $REQ_A$. The address then transitions back to the untagged state 302, as indicated by the arrow 324. The address may also be transitioned back to the untagged state 302 in response to execution of any of the following instructions:

- An ASE instruction 326 from the different requestor $REQ_B$ to the monitored address when a lock on the address has not been acquired on behalf of the requestor $REQ_A$;
- An ACLRX instruction 328 from the requestor $REQ_A$ to the monitored address when a lock on the address has not been acquired on behalf of the requestor $REQ_A$; or
- An ACLRX instruction 330 from the different requestor $REQ_B$ to the monitored address when a lock on the address has not been acquired on behalf of the requestor $REQ_B$.

Figure 4A:
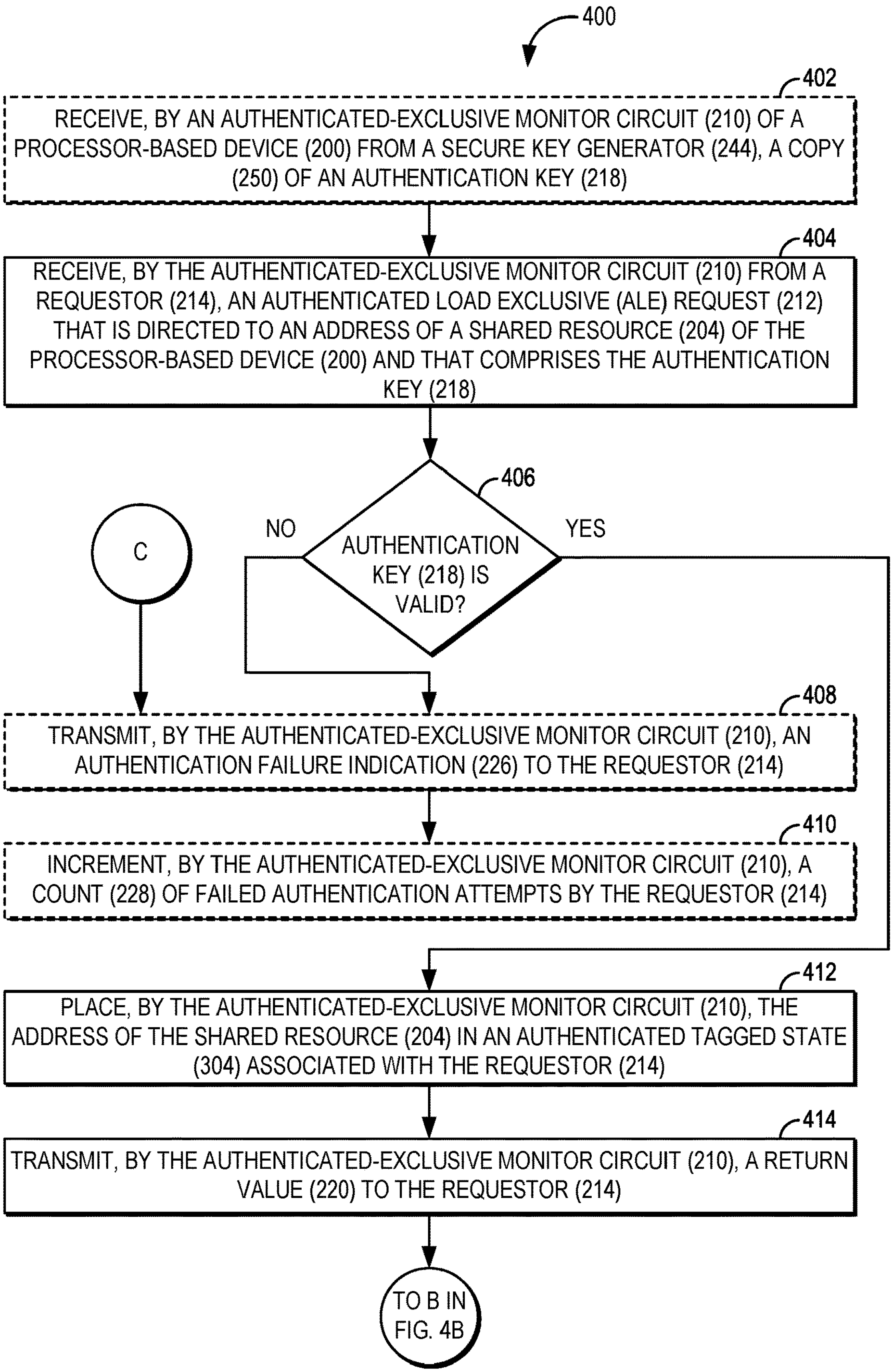
FIGS. 4A-4B are flowcharts illustrating exemplary operations of the authenticated-exclusive monitor circuits of FIG. 2 for providing authenticated-exclusive access to the shared resource of FIG. 2, according to some aspects.
Figure 4B:
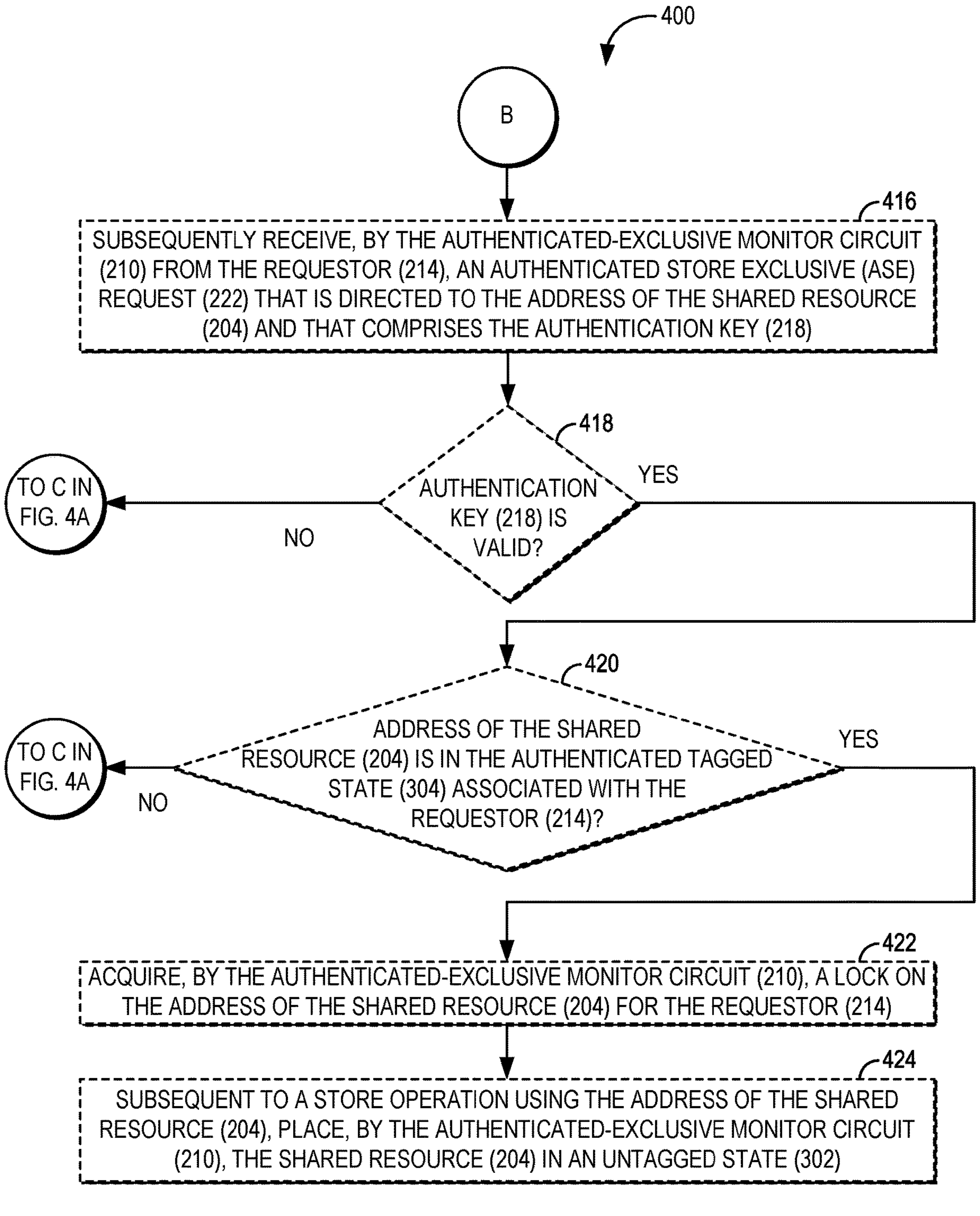

To describe operations of authenticated-exclusive monitor circuits such as the local authenticated-exclusive monitor circuits 206(0)-206(P) and the global authenticated-exclusive monitor circuit 210 of FIG. 2 for providing authenticated-exclusive access to shared resources, FIGS. 4A-4B provide a flowchart illustrating exemplary operations 400. For the sake of clarity, elements of FIGS. 2 and 3 are referenced in describing FIGS. 4A-4B. It is to be understood that some aspects may provide that some operations illustrated in FIGS. 4A-4B may be performed in an order other than that illustrated herein and/or may be omitted.

In FIG. 4A, the exemplary operations in some aspects begin with an authenticated-exclusive monitor circuit of a processor-based device (e.g., the global authenticated-exclusive monitor circuit 210 of the processor-based device 200 of FIG. 2) receiving, from a secure key generator (such as the secure key generator 244 of FIG. 2), a copy of an authentication key (e.g., the copy 250 of the authentication key 218 of FIG. 2) (block 402). The authenticated-exclusive monitor circuit 210 receives, from a requestor (e.g., the thread 214 of FIG. 2), an ALE request (such as the ALE request 212 of FIG. 2) that is directed to an address of a shared resource (e.g., the shared resource 204 of FIG. 2) of the processor-based device 200 and that comprises the authentication key 218 (block 404).

The authenticated-exclusive monitor circuit 210 then determines whether the authentication key 218 is valid (block 406). Exemplary operations that may be performed by the authenticated-exclusive monitor circuit 210 to determine whether the authentication key 218 is value are discussed in greater detail below with respect to FIG. 7. If the authentication key 218 is determined to not be valid, the authenticated-exclusive monitor circuit 210 in some aspects transmits an authentication failure indication (such as the authentication failure indication 226 of FIG. 2) to the requestor 214 (block 408). The authenticated-exclusive monitor circuit 210 in some such aspects may also increment a count (e.g., the count 228 of FIG. 2) of failed authentication attempts by the requestor 214 (block 410).

However, if the authenticated-exclusive monitor circuit 210 determines at decision block 406 that the authentication key 218 is valid, the authenticated-exclusive monitor circuit 210 places the address of the shared resource 204 in an authenticated tagged state (e.g., the authenticated tagged state 304 of FIG. 3) associated with the requestor 214 (block 412). The authenticated-exclusive monitor circuit 210 also transmits a return value (such as the return value 220 of FIG. 2) to the requestor 214 (block 414). The exemplary operations 400 in some aspects may then continue at block 416 of FIG. 4B.

Referring now to FIG. 4B, some aspects may provide that the authenticated-exclusive monitor circuit 210 subsequently receives, from the requestor 214, an ASE request (e.g., the ASE request 222 of FIG. 2) that is directed to the address of the shared resource 204 and that comprises the authentication key 218 (block 416). The authenticated-exclusive monitor circuit 210 then determines whether authentication key 218 is valid (block 418). If not, processing resumes at block 408 of FIG. 4A. If the authenticated-exclusive monitor circuit 210 determines at decision block 418 that the authentication key 218 is valid, the authenticated-exclusive monitor circuit 210 next determines whether the address of the shared resource 204 is in the authenticated tagged state 304 associated with the requestor 214 (block 420). If not, processing resumes at block 408 of FIG. 4A. However, if it is determined at decision block 420 that the address of the shared resource 204 is in the authenticated tagged state 304 associated with the requestor 214, the authenticated-exclusive monitor circuit 210 acquires a lock on the address of the shared resource 204 for the requestor 214 (block 422). Subsequent to a store operation using the address of the shared resource 204 (by, e.g., the requestor 214), the authenticated-exclusive monitor circuit 210 then places the shared resource 204 in an untagged state (e.g., the untagged state 302 of FIG. 3) (block 424).

Figure 5:
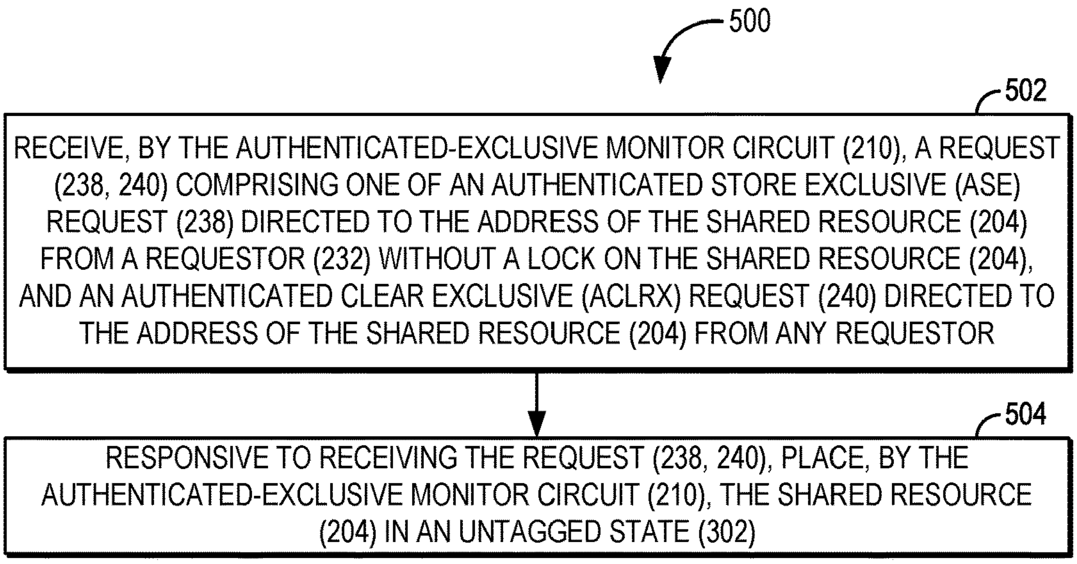
FIG. 5 is a flowchart illustrating exemplary operations of the authenticated-exclusive monitor circuits of FIG. 2 for placing the address of the shared resource of FIG. 2 in the untagged state, according to some aspects.

FIG. 5 is a flowchart illustrating exemplary operations 500 of an authenticated-exclusive monitor circuit for placing an address of a shared resource in an untagged state, according to some aspects. Elements of FIGS. 2 and 3 are referenced in describing FIG. 5 for the sake of clarity. The exemplary operations 500 begin with an authenticated-exclusive monitor circuit (e.g., the global authenticated-exclusive monitor circuit 210 of FIG. 2) receiving a request comprising one of an ASE request (e.g., the ASE request 238 of FIG. 2) directed to the address of the shared resource 204 from a requestor (e.g., the thread 232 of FIG. 2) without a lock on the address of the shared resource 204, and an ACLRX request (such as the ACLRX request 240 of FIG. 2) directed to the address of the shared resource 204 from any requestor (block 502). In response to receiving the request 238, 240, the authenticated-exclusive monitor circuit 210 places the shared resource 204 in an untagged state (e.g., the untagged state 302 of FIG. 3) (block 504).

Figure 6:
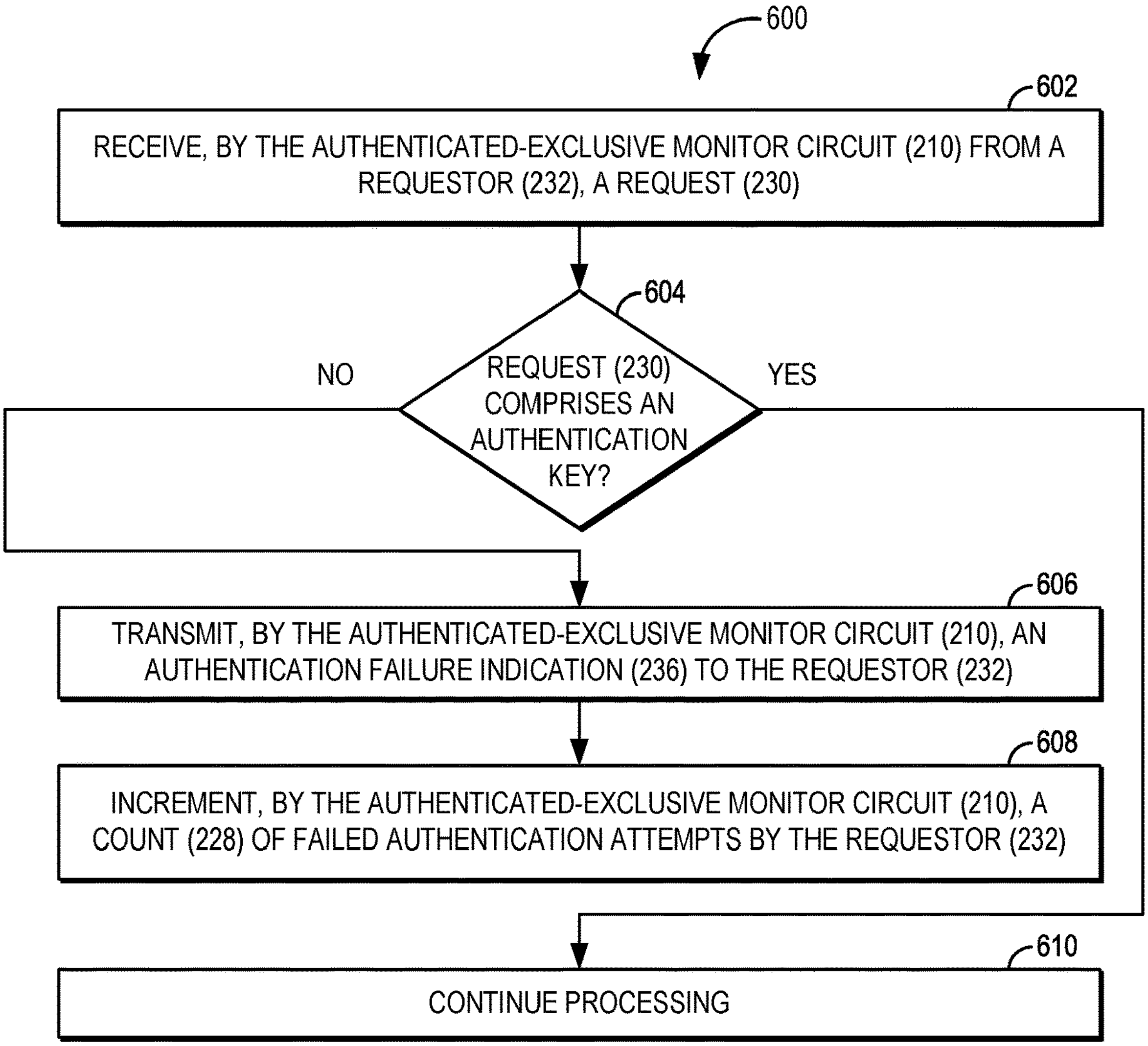
FIG. 6 is a flowchart illustrating exemplary operations of the authenticated-exclusive monitor circuits of FIG. 2 for handling requests that lack authentication keys, according to some aspects.

To describe exemplary operations of an authenticated-exclusive monitor circuit for handling requests that lack authentication keys according to some aspects, FIG. 6 provides a flowchart illustrating exemplary operations 600. For the sake of clarity, elements of FIG. 2 are referenced in describing FIG. 6. The exemplary operations 600 begin with an authenticated-exclusive monitor circuit (e.g., the global authenticated-exclusive monitor circuit 210 of FIG. 2) receiving, from a requestor (e.g., the thread 232 of FIG. 2), a request (e.g., the request 230 of FIG. 2) (block 602). The authenticated-exclusive monitor circuit 210 determines whether the request 230 comprises an authentication key (block 604). If not, the authenticated-exclusive monitor circuit 210 transmits an authentication failure indication (e.g., the authentication failure indication 236 of FIG. 2) to the requestor 232 (block 606). In some aspects, the authenticated-exclusive monitor circuit 210 also increments a count (e.g., the count 228 of FIG. 2) of failed authentication attempts by the requestor 232 (block 608). If the authenticated-exclusive monitor circuit 210 determines at decision block 604 that the request 230 does comprise an authentication key 218, processing continues (e.g., at block 406 of FIG. 4A) (block 610).

Figure 7:
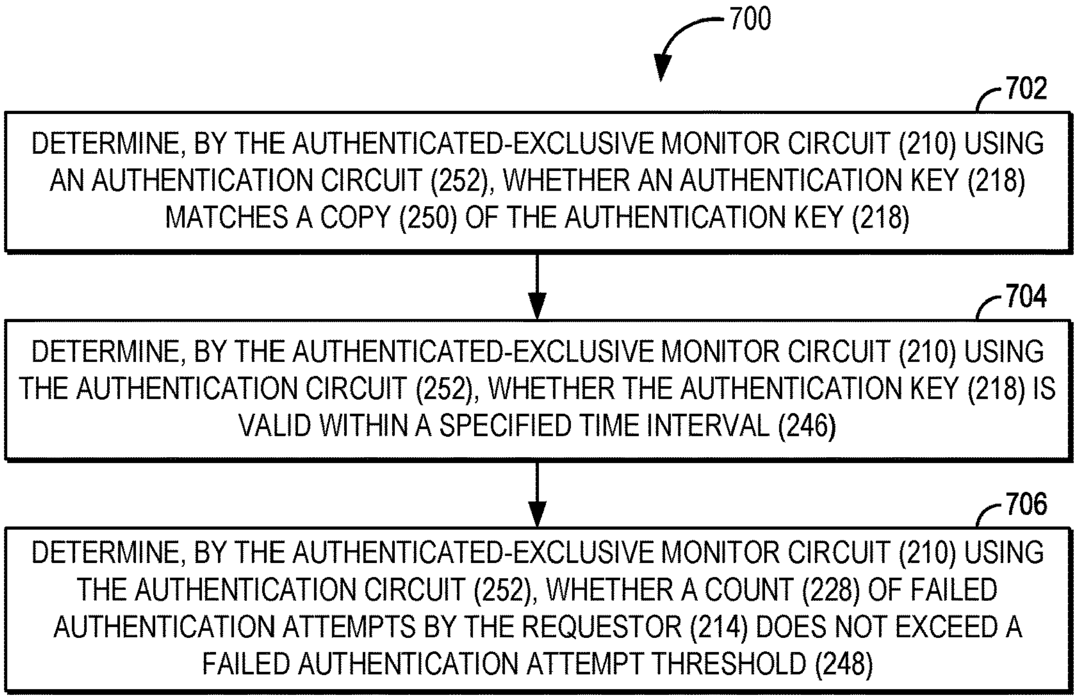
FIG. 7 is a flowchart illustrating exemplary operations of the authenticated-exclusive monitor circuits of FIG. 2 for validating the authentication key of FIG. 2, according to some aspects.

FIG. 7 is a flowchart illustrating exemplary operations 700 of an authenticated-exclusive monitor circuit for validating an authentication key, according to some aspects. Elements of FIG. 2 are referenced in describing FIG. 7 for the sake of clarity. It is to be understood that the exemplary operations 700 may correspond to the operations of block 406 of FIG. 4A and block 418 of FIG. 4B for determining whether the authentication key 218 is valid. In some aspects, an authenticated-exclusive monitor circuit (e.g., the global authenticated-exclusive monitor circuit 210 of FIG. 2) uses an authentication circuit (such as the authentication circuit 252 of FIG. 2) to determine whether an authentication key (e.g., the authentication key 218 of FIG. 2) matches a copy (such as the copy 250 of FIG. 2) of the authentication key 218 (block 702). The authenticated-exclusive monitor circuit 210 may also determine, using the authentication circuit 252, whether the authentication key 218 is valid within a specified time interval (e.g., the specified time interval 246 of FIG. 2) (block 704). The authenticated-exclusive monitor circuit 210 additionally may use the authentication circuit 252 to determine whether a count (e.g., the count 228 of FIG. 2) of failed authentication attempts by a requestor (e.g., the thread 214 of FIG. 2) does not exceed a failed authentication attempt threshold (such as the failed authentication attempt threshold 248 of FIG. 2) (block 706).

An authenticated-exclusive monitor circuit as disclosed in aspects described herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 8:
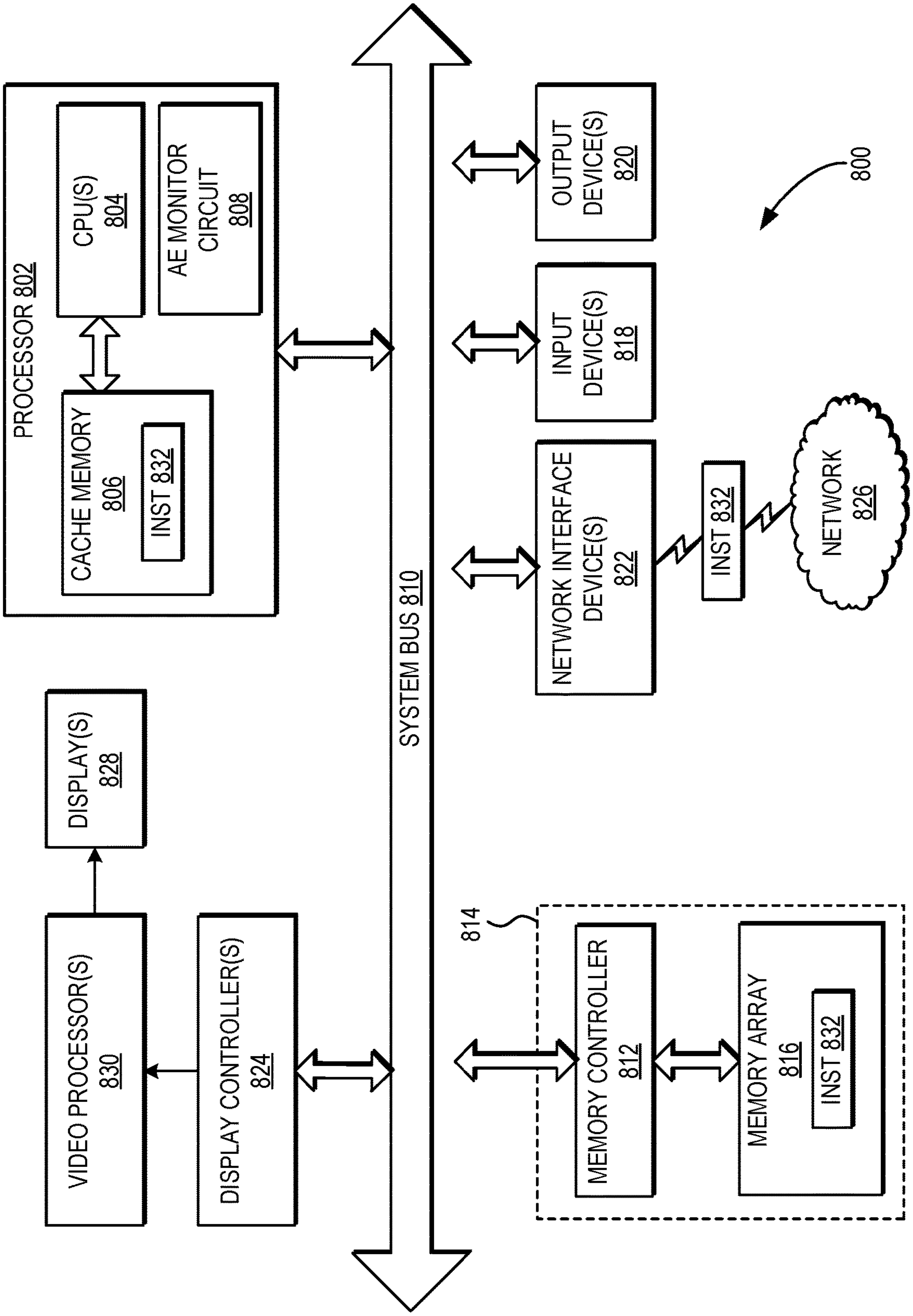
FIG. 8 is a block diagram of an exemplary processor-based device that includes but is not limited to the processor-based device of FIG. 2.

In this regard, FIG. 8 illustrates an example of a processor-based device 800 that may comprise the processor-based device 200 illustrated in FIG. 2. In this example, the processor-based device 800 includes a processor 802 that includes one or more central processing units (captioned as "CPUs" in FIG. 8) 804, which may comprise the processor cores 202(0)-202(P) of FIG. 2. The processor 802 may have cache memory 806 coupled to the processor 802 for rapid access to temporarily stored data. The processor 802 further comprises an authenticated-exclusive monitor circuit (captioned as "AE MONITOR CIRCUIT" in FIG. 8) 808, which corresponds in functionality to the local authenticated-exclusive monitor circuits 206(0)-206(P) and/or the global authenticated-exclusive monitor circuit 210 of FIG. 2.

The processor 802 is coupled to a system bus 810 and can intercouple primary and secondary devices included in the processor-based device 800. As is well known, the processor 802 communicates with these other devices by exchanging address, control, and data information over the system bus 810. For example, the processor 802 can communicate bus transaction requests to a memory controller 812, as an example of a secondary device. Although not illustrated in FIG. 8, multiple system buses 810 could be provided, wherein each system bus 810 constitutes a different fabric.

Other primary and secondary devices can be connected to the system bus 810. As illustrated in FIG. 8, these devices can include a memory system 814 that includes the memory controller 812 and one or more memory arrays 816, one or more input devices 818, one or more output devices 820, one or more network interface devices 822, and one or more display controllers 824, as examples. The input device(s)

818 can include any type of input device, including but not limited to input keys, switches, voice processors, etc. The output device(s) 820 can include any type of output device, including, but not limited to, audio, video, other visual indicators, etc. The network interface device(s) 822 can be any device configured to allow exchange of data to and from a network 826. The network 826 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 822 can be configured to support any type of communications protocol desired.

The processor 802 may also be configured to access the display controller(s) 824 over the system bus 810 to control information sent to one or more displays 828. The display controller(s) 824 sends information to the display(s) 828 to be displayed via one or more video processors 830, which process the information to be displayed into a format suitable for the display(s) 828. The display controller(s) 824 and/or the video processors 830 may be comprise or be integrated into a GPU. The display(s) 828 can include any type of display, including but not limited to a cathode ray tube (CRT), a liquid crystal display (LCD), a plasma display, etc.

The processor-based device 800 in FIG. 8 may include a set of instructions (captioned as "INST" in FIG. 8) 832 that may be executed by the processor 802 for any application desired according to the instructions. The instructions 832 may be stored in the one or more memory arrays 816, the processor 802, and/or the cache memory 806, each of which may comprise an example of a non-transitory computer-readable medium. The instructions 832 may also reside, completely or at least partially, within the one or more memory arrays 816 and/or within the processor 802 during their execution. The instructions 832 may further be transmitted or received over the network 826, such that the network 826 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the one or more sets of instructions 832. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device comprising:
a plurality of processor cores;
a shared resource communicatively coupled to each processor core of the plurality of processor cores via an interconnect; and
an authenticated-exclusive monitor circuit configured to:
receive, from a first requestor, an authenticated load exclusive (ALE) request that is directed to an address of the shared resource and that comprises a first authentication key;
determine whether the first authentication key is valid; and
responsive to determining that the first authentication key is valid:
place the address of the shared resource in an authenticated tagged state associated with the first requestor; and
transmit a return value to the first requestor.

2. The processor-based device of clause 1, wherein the ALE request results from execution of an ALE instruction of an instruction set architecture (ISA) implemented by the processor-based device.

3. The processor-based device of any one of clauses 1-2, wherein the authenticated-exclusive monitor circuit is further configured to:
subsequently receive, from the first requestor, an authenticated store exclusive (ASE) request that is directed to the address of the shared resource and that comprises the first authentication key;
determine whether the first authentication key is valid; and
responsive to determining that the first authentication key is valid:
determine whether the address of the shared resource is in the authenticated tagged state associated with the first requestor; and
responsive to determining that the address of the shared resource is in the authenticated tagged state associated with the first requestor:
acquire a lock on the address of the shared resource for the first requestor; and
subsequent to a store operation using the address of the shared resource, place the address of the shared resource in an untagged state.

4. The processor-based device of clause 3, wherein the ASE request results from execution of an ASE instruction of an instruction set architecture (ISA) implemented by the processor-based device.

5. The processor-based device of any one of clauses 1-4, wherein the authenticated-exclusive monitor circuit is further configured to:
receive a request comprising one of:
an authenticated store exclusive (ASE) request directed to the address of the shared resource from a second requestor without a lock on the address of the shared resource; and
an authenticated clear exclusive (ACLRX) request directed to the address of the shared resource from any requestor; and
responsive to receiving the request, place the address of the shared resource in an untagged state.

6. The processor-based device of any one of clauses 1-5, wherein the authenticated-exclusive monitor circuit is further configured to:
receive, from a third requestor, a request;
determine whether the request comprises an authentication key; and
responsive to determining that the request does not comprise an authentication key:
transmit an authentication failure indication to the third requestor; and
increment a count of failed authentication attempts by the third requestor.

7. The processor-based device of any one of clauses 1-6, wherein the authenticated-exclusive monitor circuit is further configured to:
receive, from a fourth requestor, a request comprising a second authentication key;
determine whether the second authentication key is valid; and
responsive to determining that the second authentication key is not valid:
transmit an authentication failure indication to the fourth requestor; and
increment a count of failed authentication attempts by the fourth requestor.

8. The processor-based device of any one of clauses 1-7, wherein:
the authenticated-exclusive monitor circuit comprises an authentication circuit;
the authenticated-exclusive monitor circuit is further configured to receive, from a secure key generator, a copy of the first authentication key; and
the authenticated-exclusive monitor circuit is configured to determine whether the first authentication key is valid by being configured to, using the authentication circuit, determine whether the first authentication key matches the copy of the first authentication key.

9. The processor-based device of clause 8, wherein the authenticated-exclusive monitor circuit is configured to determine whether the first authentication key is valid by being further configured to, using the authentication circuit, determine whether the first authentication key is valid within a specified time interval.

10. The processor-based device of clause 8, wherein the authenticated-exclusive monitor circuit is configured to determine whether the first authentication key is valid by being further configured to, using the authentication circuit, determine whether a count of failed authentication attempts by the first requestor does not exceed a failed authentication attempt threshold.

11. The processor-based device of any one of clauses 1-10, wherein:
the shared resource comprises a memory device of the processor-based device; and
the address of the shared resource comprises a memory address indicating a memory location of the memory device.

12. The processor-based device of any one of clauses 1-11, wherein:
the authenticated-exclusive monitor circuit is an element of a local monitor circuit of a processor core of the plurality of processor cores; and
the first requestor comprises a thread executing on the processor core.

13. The processor-based device of any one of clauses 1-11, wherein:
the authenticated-exclusive monitor circuit is an element of a global monitor circuit of the processor-based device; and the first requestor comprises a thread executing on a processor core of the plurality of processor cores.

14. The processor-based device of any one of clauses 1-13, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A processor-based device comprising:

means for receiving, from a first requestor, an authenticated load exclusive (ALE) request that is directed to an address of a shared resource and that comprises a first authentication key;

means for determining whether the first authentication key is valid;

means for placing the address of the shared resource in an authenticated tagged state associated with the first requestor, responsive to determining that the first authentication key is valid; and means for transmitting a return value to the first requestor, further responsive to determining that the first authentication key is valid.

16. A method for providing authenticated-exclusive access to shared resources in processor-based devices, comprising:

receiving, by an authenticated-exclusive monitor circuit of a processor-based device from a first requestor, an authenticated load exclusive (ALE) request that is directed to an address of a shared resource of the processor-based device and that comprises a first authentication key;

determining, by the authenticated-exclusive monitor circuit, that the first authentication key is valid; and responsive to determining that the first authentication key is valid:

placing, by the authenticated-exclusive monitor circuit, the address of the shared resource in an authenticated tagged state associated with the first requestor; and transmitting, by the authenticated-exclusive monitor circuit, a return value to the first requestor.

17. The method of clause 16, wherein the ALE request results from execution of an ALE instruction of an instruction set architecture (ISA) implemented by the processor-based device.

18. The method of any one of clauses 16-17, further comprising:

subsequently receiving, by the authenticated-exclusive monitor circuit from the first requestor, an authenticated store exclusive (ASE) request that is directed to the address of the shared resource and that comprises the first authentication key;

determining, by the authenticated-exclusive monitor circuit, that the first authentication key is valid; and responsive to determining that the first authentication key is valid:

determining, by the authenticated-exclusive monitor circuit, that the address of the shared resource is in the authenticated tagged state associated with the first requestor; and responsive to determining that the address of the shared resource is in the authenticated tagged state associated with the first requestor:

acquiring, by the authenticated-exclusive monitor circuit, a lock on the address of the shared resource for the first requestor; and subsequent to a store operation using the address of the shared resource, placing, by the authenticated-exclusive monitor circuit, the address of the shared resource in an untagged state.

19. The method of clause 18, wherein the ASE request results from execution of an ASE instruction of an instruction set architecture (ISA) implemented by the processor-based device.

20. The method of any one of clauses 16-19, further comprising:

receiving, by the authenticated-exclusive monitor circuit, a request comprising one of:

an authenticated store exclusive (ASE) request directed to the address of the shared resource from a second requestor without a lock on the address of the shared resource; and an authenticated clear exclusive (ACLRX) request directed to the address of the shared resource from any requestor; and responsive to receiving the request, placing, by the authenticated-exclusive monitor circuit, the address of the shared resource in an untagged state.

21. The method of any one of clauses 16-20, further comprising:

receiving, by the authenticated-exclusive monitor circuit from a third requestor, a request;

determining, by the authenticated-exclusive monitor circuit, that the request does not comprise an authentication key; and responsive to determining that the request does not comprise an authentication key:

transmitting, by the authenticated-exclusive monitor circuit, an authentication failure indication to the third requestor; and incrementing, by the authenticated-exclusive monitor circuit, a count of failed authentication attempts by the third requestor.

22. The method of any one of clauses 16-21, further comprising:

receiving, by the authenticated-exclusive monitor circuit from a fourth requestor, a request comprising a second authentication key;

determining, by the authenticated-exclusive monitor circuit, that the second authentication key is valid; and responsive to determining that the second authentication key is not valid:

transmitting, by the authenticated-exclusive monitor circuit, an authentication failure indication to the fourth requestor; and incrementing, by the authenticated-exclusive monitor circuit, a count of failed authentication attempts by the fourth requestor.

23. The method of any one of clauses 16-22, wherein:

the authenticated-exclusive monitor circuit comprises an authentication circuit;

the method further comprises receiving, by the authenticated-exclusive monitor circuit from a secure key generator, a copy of the first authentication key; and determining that the first authentication key is valid comprises determining, by the authenticated-exclusive monitor circuit using the authentication circuit, that the first authentication key matches the copy of the first authentication key.

24. The method of clause 23, wherein determining that the first authentication key is valid further comprises determining, by the authenticated-exclusive monitor circuit using the authentication circuit, that the first authentication key is valid within a specified time interval.

25. The method of clause 23, wherein determining that the first authentication key is valid comprises determining, by the authenticated-exclusive monitor circuit using the authentication circuit, that a count of failed authentication attempts by the first requestor does not exceed a failed authentication attempt threshold.

26 The method of any one of clauses 16-25, wherein:

the shared resource comprises a memory device of the processor-based device; and the address of the shared resource comprises a memory address indicating a memory location of the memory device.

27. The method of any one of clauses 16-26, wherein:

the authenticated-exclusive monitor circuit is an element of a local monitor circuit of a processor core of a plurality of processor cores of the processor-based device; and the first requestor comprises a thread executing on the processor core.

28. The method of any one of clauses 16-26, wherein:

the authenticated-exclusive monitor circuit is an element of a global monitor circuit of the processor-based device; and the first requestor comprises a thread executing on a processor core of a plurality of processor cores.

29. A non-transitory computer-readable medium having stored thereon computer-executable instructions which, when executed by a processor-based device, cause the processor-based device to:

receive, from a first requestor, an authenticated load exclusive (ALE) request that is directed to an address of a shared resource of the processor-based device and that comprises a first authentication key;

determine whether the first authentication key is valid; and responsive to determining that the first authentication key is valid:

place the address of the shared resource in an authenticated tagged state associated with the first requestor; and transmit a return value to the first requestor.

30. The non-transitory computer-readable medium of clause 29, wherein the computer-executable instructions further cause the processor-based device to:

subsequently receive, from the first requestor, an authenticated store exclusive (ASE) request that is directed to the address of the shared resource and that comprises the first authentication key;

determine whether the first authentication key is valid; and responsive to determining that the first authentication key is valid:

determine whether the address of the shared resource is in the authenticated tagged state associated with the first requestor; and responsive to determining that the address of the shared resource is in the authenticated tagged state associated with the first requestor:

acquire a lock on the address of the shared resource for the first requestor; and subsequent to a store operation using the address of the shared resource, place the address of the shared resource in an untagged state.

What is claimed is:

1. A processor-based device comprising:

a plurality of processor cores;

a shared resource communicatively coupled to each processor core of the plurality of processor cores via an interconnect; and an authenticated-exclusive monitor circuit configured to:

receive, from a first requestor, an authenticated load exclusive (ALE) request that is directed to an address of the shared resource and that comprises a first authentication key;

determine whether the first authentication key is valid; and responsive to determining that the first authentication key is valid:

place the address of the shared resource in an authenticated tagged state associated with the first requestor; and transmit a return value to the first requestor, wherein the authenticated-exclusive monitor circuit is further configured to:

subsequently receive, from the first requestor, an authenticated store exclusive (ASE) request that is directed to the address of the shared resource and that comprises the first authentication key;

determine whether the first authentication key is valid; and responsive to determining that the first authentication key is valid:

determine whether the address of the shared resource is in the authenticated tagged state associated with the first requestor; and responsive to determining that the address of the shared resource is in the authenticated tagged state associated with the first requestor:

acquire a lock on the address of the shared resource for the first requestor; and subsequent to a store operation using the address of the shared resource, place the address of the shared resource in an untagged state.

2. The processor-based device of claim 1, wherein the ALE request results from execution of an ALE instruction of an instruction set architecture (ISA) implemented by the processor-based device.

3. The processor-based device of claim 1, wherein the ASE request results from execution of an ASE instruction of an instruction set architecture (ISA) implemented by the processor-based device.

4. The processor-based device of claim 1, wherein the authenticated-exclusive monitor circuit is further configured to:

receive a request comprising one of:

an authenticated store exclusive (ASE) request directed to the address of the shared resource from a second requestor without a lock on the address of the shared resource; and an authenticated clear exclusive (ACLRX) request directed to the address of the shared resource from any requestor; and responsive to receiving the request, place the address of the shared resource in an untagged state.

5. The processor-based device of claim 1, wherein the authenticated-exclusive monitor circuit is further configured to:

receive, from a third requestor, a request;

determine whether the request comprises an authentication key; and responsive to determining that the request does not comprise an authentication key:

transmit an authentication failure indication to the third requestor; and increment a count of failed authentication attempts by the third requestor.

6. The processor-based device of claim 1, wherein the authenticated-exclusive monitor circuit is further configured to:

receive, from a fourth requestor, a request comprising a second authentication key;

determine whether the second authentication key is valid; and responsive to determining that the second authentication key is not valid:

transmit an authentication failure indication to the fourth requestor; and increment a count of failed authentication attempts by the fourth requestor.

7. The processor-based device of claim 1, wherein:

the authenticated-exclusive monitor circuit comprises an authentication circuit;

the authenticated-exclusive monitor circuit is further configured to receive, from a secure key generator, a copy of the first authentication key; and the authenticated-exclusive monitor circuit is configured to determine whether the first authentication key is valid by being configured to, using the authentication circuit, determine whether the first authentication key matches the copy of the first authentication key.

8. The processor-based device of claim 7, wherein the authenticated-exclusive monitor circuit is configured to determine whether the first authentication key is valid by being further configured to, using the authentication circuit, determine whether the first authentication key is valid within a specified time interval.

9. The processor-based device of claim 7, wherein the authenticated-exclusive monitor circuit is configured to determine whether the first authentication key is valid by being further configured to, using the authentication circuit, determine whether a count of failed authentication attempts by the first requestor does not exceed a failed authentication attempt threshold.

10. The processor-based device of claim 1, wherein:

the shared resource comprises a memory device of the processor-based device; and the address of the shared resource comprises a memory address indicating a memory location of the memory device.

11. The processor-based device of claim 1, wherein:

the authenticated-exclusive monitor circuit is an element of a local monitor circuit of a processor core of the plurality of processor cores; and the first requestor comprises a thread executing on the processor core.

12. The processor-based device of claim 1, wherein:

the authenticated-exclusive monitor circuit is an element of a global monitor circuit of the processor-based device; and the first requestor comprises a thread executing on a processor core of the plurality of processor cores.

13. The processor-based device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

14. A method for providing authenticated-exclusive access to shared resources in processor-based devices, comprising:

receiving, by an authenticated-exclusive monitor circuit of a processor-based device from a first requestor, an authenticated load exclusive (ALE) request that is directed to an address of a shared resource of the processor-based device and that comprises a first authentication key;

determining, by the authenticated-exclusive monitor circuit, that the first authentication key is valid;

responsive to determining that the first authentication key is valid:

placing, by the authenticated-exclusive monitor circuit, the address of the shared resource in an authenticated tagged state associated with the first requestor; and transmitting, by the authenticated-exclusive monitor circuit, a return value to the first requestor;

subsequently receiving, by the authenticated-exclusive monitor circuit from the first requestor, an authenticated store exclusive (ASE) request that is directed to the address of the shared resource and that comprises the first authentication key;

determining, by the authenticated-exclusive monitor circuit, that the first authentication key is valid; and responsive to determining that the first authentication key is valid:

determining, by the authenticated-exclusive monitor circuit, that the address of the shared resource is in the authenticated tagged state associated with the first requestor; and responsive to determining that the address of the shared resource is in the authenticated tagged state associated with the first requestor:

acquiring, by the authenticated-exclusive monitor circuit, a lock on the address of the shared resource for the first requestor; and subsequent to a store operation using the address of the shared resource, placing, by the authenticated-exclusive monitor circuit, the address of the shared resource in an untagged state.

15. The method of claim 14, wherein the ALE request results from execution of an ALE instruction of an instruction set architecture (ISA) implemented by the processor-based device.

16. The method of claim 14, wherein the ASE request results from execution of an ASE instruction of an instruction set architecture (ISA) implemented by the processor-based device.

17. The method of claim 14, further comprising:

receiving, by the authenticated-exclusive monitor circuit, a request comprising one of:

an authenticated store exclusive (ASE) request directed to the address of the shared resource from a second requestor without a lock on the address of the shared resource; and an authenticated clear exclusive (ACLRX) request directed to the address of the shared resource from any requestor; and responsive to receiving the request, placing, by the authenticated-exclusive monitor circuit, the address of the shared resource in an untagged state.

18. The method of claim 14, further comprising:

receiving, by the authenticated-exclusive monitor circuit from a third requestor, a request;

determining, by the authenticated-exclusive monitor circuit, that the request does not comprise an authentication key; and responsive to determining that the request does not comprise an authentication key:

transmitting, by the authenticated-exclusive monitor circuit, an authentication failure indication to the third requestor; and incrementing, by the authenticated-exclusive monitor circuit, a count of failed authentication attempts by the third requestor.

19. The method of claim 14, further comprising:

receiving, by the authenticated-exclusive monitor circuit from a fourth requestor, a request comprising a second authentication key;

determining, by the authenticated-exclusive monitor circuit, that the second authentication key is valid; and responsive to determining that the second authentication key is not valid:

transmitting, by the authenticated-exclusive monitor circuit, an authentication failure indication to the fourth requestor; and incrementing, by the authenticated-exclusive monitor circuit, a count of failed authentication attempts by the fourth requestor.

20. The method of claim 14, wherein:

the authenticated-exclusive monitor circuit comprises an authentication circuit;

the method further comprises receiving, by the authenticated-exclusive monitor circuit from a secure key generator, a copy of the first authentication key; and determining that the first authentication key is valid comprises determining, by the authenticated-exclusive monitor circuit using the authentication circuit, that the first authentication key matches the copy of the first authentication key.

21. The method of claim 20, wherein determining that the first authentication key is valid further comprises determining, by the authenticated-exclusive monitor circuit using the authentication circuit, that the first authentication key is valid within a specified time interval.

22. The method of claim 20, wherein determining that the first authentication key is valid comprises determining, by the authenticated-exclusive monitor circuit using the authentication circuit, that a count of failed authentication attempts by the first requestor does not exceed a failed authentication attempt threshold.

23. The method of claim 14, wherein:

the shared resource comprises a memory device of the processor-based device; and the address of the shared resource comprises a memory address indicating a memory location of the memory device.

24. The method of claim 14, wherein:

the authenticated-exclusive monitor circuit is an element of a local monitor circuit of a processor core of a plurality of processor cores of the processor-based device; and the first requestor comprises a thread executing on the processor core.

25. The method of claim 14, wherein:

the authenticated-exclusive monitor circuit is an element of a global monitor circuit of the processor-based device; and the first requestor comprises a thread executing on a processor core of a plurality of processor cores.

26. A non-transitory computer-readable medium having stored thereon computer-executable instructions which, when executed by a processor-based device, cause the processor-based device to:

receive, from a first requestor, an authenticated load exclusive (ALE) request that is directed to an address of a shared resource of the processor-based device and that comprises a first authentication key;

determine whether the first authentication key is valid; and responsive to determining that the first authentication key is valid:

place the address of the shared resource in an authenticated tagged state associated with the first requestor; and transmit a return value to the first requestor, wherein the computer-executable instructions further cause the processor-based device to:

subsequently receive, from the first requestor, an authenticated store exclusive (ASE) request that is directed to the address of the shared resource and that comprises the first authentication key;

determine whether the first authentication key is valid; and responsive to determining that the first authentication key is valid:

determine whether the address of the shared resource is in the authenticated tagged state associated with the first requestor; and responsive to determining that the address of the shared resource is in the authenticated tagged state associated with the first requestor:

acquire a lock on the address of the shared resource for the first requestor; and subsequent to a store operation using the address of the shared resource, place the address of the shared resource in an untagged state.

* * * * *